Jan. 18, 1949.
H. MILLIKEN
APPARATUS FOR CONVERTING HEAT
ENERGY INTO USEFUL WORK
2,459,447
Filed March 4, 1944
2 Sheets-Sheet 1
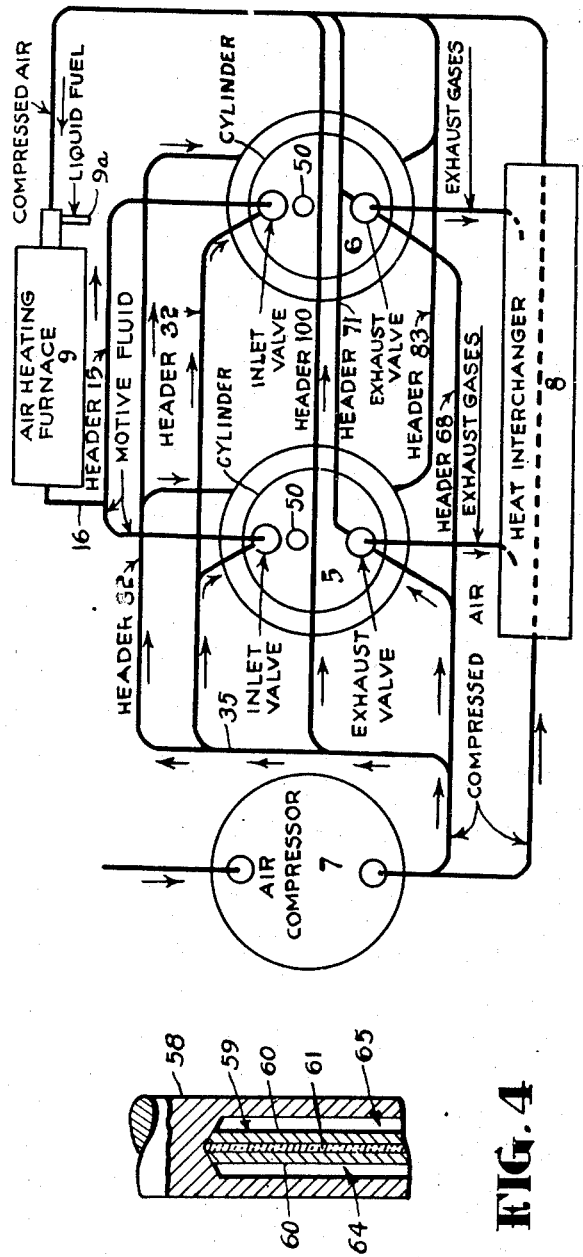
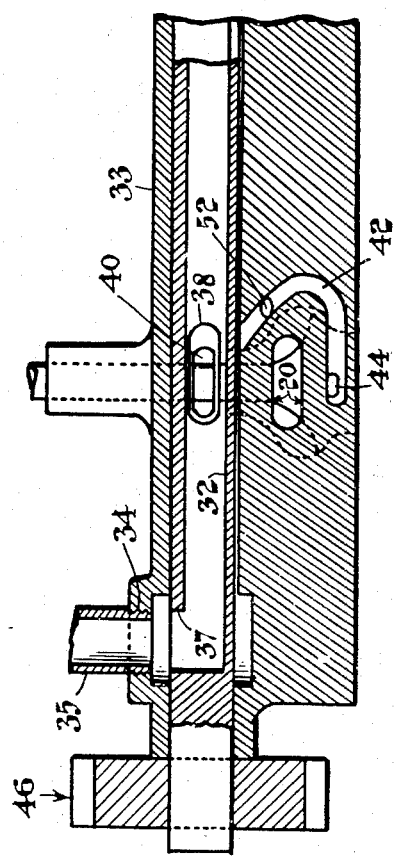
INVENTOR
H. MILLIKEN
BY Fetherstonhaugh & Co.
ATTORNEYS Jan. 18, 1949.　　　　　　H. MILLIKEN　　　　　　2,459,447
　　　　　　　APPARATUS FOR CONVERTING HEAT
　　　　　　　　ENERGY INTO USEFUL WORK
Filed March 4, 1944　　　　　　　　　　　2 Sheets-Sheet 2

INVENTOR
H. MILLIKEN
BY Featherstonhaugh & Co.
ATTORNEYS

Patented Jan. 18, 1949

2,459,447

UNITED STATES PATENT OFFICE 2,459,447

APPARATUS FOR CONVERTING HEAT ENERGY INTO USEFUL WORK

Humphreys Milliken, Mount Royal, Quebec, Canada

Application March 4, 1944, Serial No. 525,034

9 Claims. (Cl. 60—44)

This invention relates to the conversion of heat energy into useful work and has particular reference to improvements in conversion apparatus or power plants of the type described in my co-pending applications Serial No. 469,027, filed Dec. 14, 1942, now Patent No. 2,404,395, and Serial No. 498,603, filed Aug. 13, 1943.

According to the inventions described in said co-pending applications, a substantial amount of compressed air is continuously passed from a compressor through an air heating furnace in which the volume of the compressed air is increased at substantially constant pressure by admixture with hot products of combustion resulting from ignition of fuel supplied to said furnace. The heated compressed air and the combustion products mixed therewith are conducted directly from the furnace to the working cylinder of a high pressure engine of the reciprocating piston type and is there expanded to produce power, the exhaust from said engine being utilized to heat the aforesaid compressed air as the latter passes from the compressor to the air heating furnace.

In the operation of said high pressure engine the inlet and exhaust valves open and close in the same sequence as the corresponding valves in a steam engine. The inlet valve is usually operated so that it is opened only for the period of time required for the piston to complete approximately one-third of its working stroke and remains closed during the remaining two-thirds of the working stroke and throughout the entire period of the exhaust stroke. The inlet valve thus remains closed for approximately five-sixths of the time required for a complete cycle of engine operation and, during such time, is continuously absorbing heat from the hot motive fluid mixture which is supplied to the engine inlet passage at full furnace temperature. It will thus be seen that, in the absence of efficient means for cooling the inlet valve, the maximum temperature of the motive fluid supplied to the engine inlet must be kept at a relatively low value to avoid overheating and damaging the inlet valve. This places a relatively low limit on the permissible pressure to which the air can be compressed and thus prevents the attainment of the higher engine efficiencies which are possible with a more highly heated motive fluid.

The engine exhaust valve, while not subjected to the same high temperatures as the inlet valve, also requires cooling since the heat to which it is subjected is continuously supplied. Another factor limiting the maximum pressure and temperature of the motive fluid supplied to the engine cylinder is the necessity of avoiding overheating of the engine cylinder and piston and overheating and carbonization of the lubricating oil film.

In my said co-pending applications I have described arrangements for cooling the engine valves and the lubricating oil in an efficient manner which permits the motive fluid to be supplied to the engine cylinder at a pressure and temperature which ensures a high engine efficiency. The present invention relates to further improvements along these lines and provides improved valve and oil cooling arrangements which enable the power and thermal efficiency characteristics of the engine to be substantially increased.

The invention also embodies other improvements which will become apparent from the following detailed description of the accompanying drawings, wherein—

Fig. 1 is a diagrammatic view of a complete power plant embodying said invention.

Fig. 3 is an enlarged detail sectional view of a portion of the cylinder head assembly shown in Fig. 2, the section being taken on the line 3—3 of Fig. 2.

Fig. 4 is an enlarged fragmentary sectional view of the hollow stem portion of the exhaust valve shown in Fig. 2.

Figure 2:
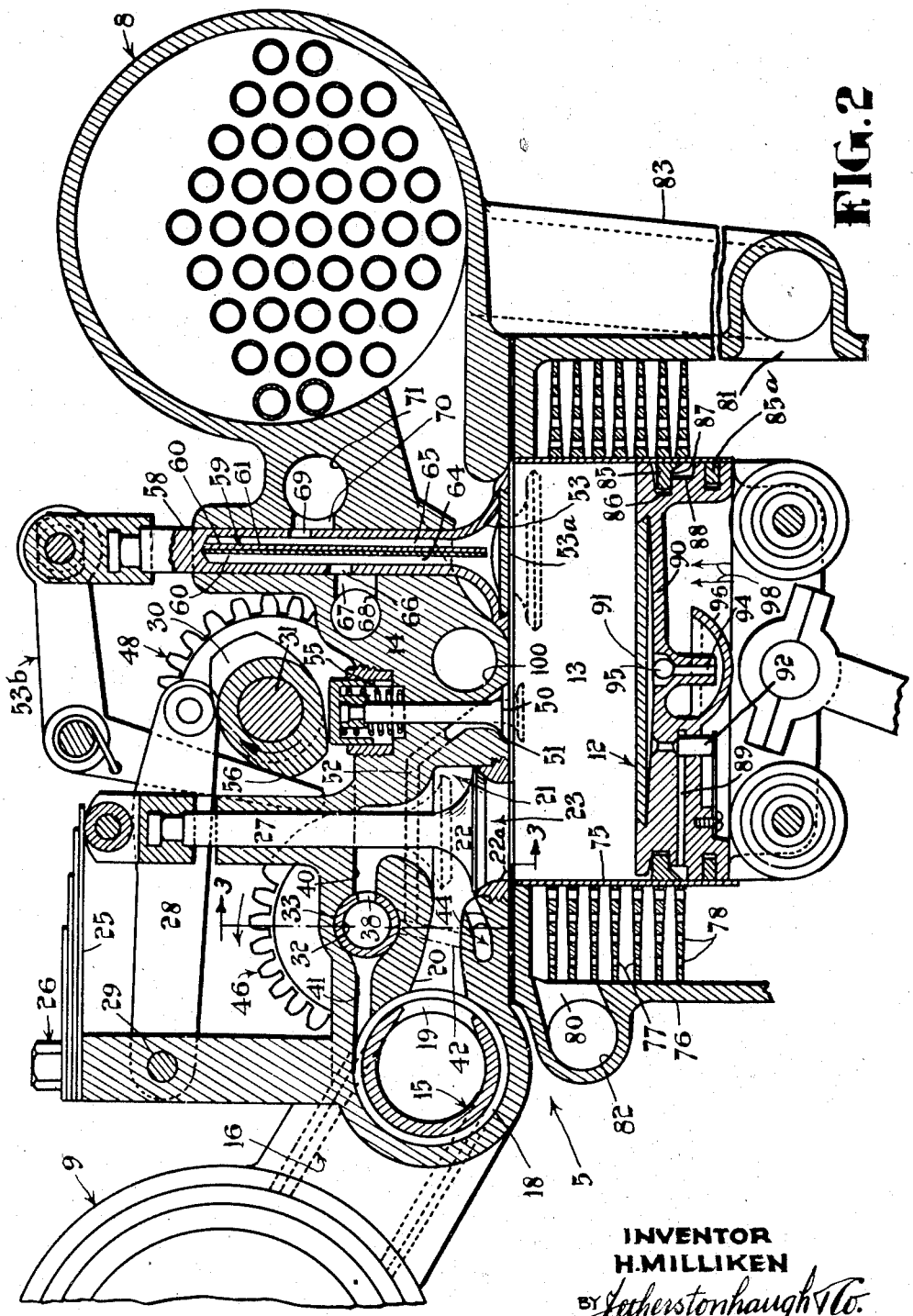
Fig. 2 is a vertical sectional view showing the construction of the piston, cylinder and cylinder head assembly of one of the engine cylinders forming part of the power plant illustrated in Fig. 1.

The complete power plant shown in Fig. 1 includes a multi-cylinder high pressure engine represented by cylinder units 5 and 6 of duplicate construction, an air compressor 7, a heat interchanger 8, and an air heating furnace 9. A portion of the air compressed by compressor 7 is delivered through heat interchanger 8 to furnace 9 where its volume is increased at constant pressure by admixture with hot products of combustion resulting from the burning of liquid fuel supplied to furnace 9 through fuel supply pipe 9a. The resulting motive fluid, consisting of preheated compressed air mixed with hot products of combustion, is successively introduced into each of the cylinders 5 and 6 and expanded to produce power. Another portion of the air compressed by compressor 7 is utilized to cool various component parts of the engine in such manner that the heat energy absorbed by the cooling medium is converted into useful work in the engine cylinders 5 and 6.

The foregoing and other characteristic features of the power plant shown in Fig. 1 will be more readily understood from the following discussion of Figs. 2 and 3, which illustrate the construction and arrangement of the important component parts of each cylinder unit of the two-cylinder engine. The cylinder unit illustrated in Figs. 2 and 3 is designated 5 but it will be understood that the same description applies to the cylinder unit 6.

As here shown cylinder unit 5 comprises a reciprocating piston 12 working in a cylinder 13 equipped with a cylinder head casting 14 which is also common to cylinder unit 6.

The cylinder head 14 is provided with a stationary motive-fluid header 15 to which the motive fluid is delivered from furnace 9 through a suitable conduit 16. Header 15 is partly surrounded by a jacket 18 and is provided with an outlet 19 through which the motive fluid passes into a passage 20 leading to inlet valve chamber 21. A main inlet valve 22 controls an inlet opening 23 through which the motive fluid is delivered to cylinder 13 in the open position of said valve. Valve 22 is a conventional tappet valve and may be opened and closed by any suitable form of valve operating mechanism. In the present instance I have shown valve closing means comprising a leaf spring 25 having one end fastened to the cylinder head as indicated at 26 and having its other end bearing on the upper extremity of the valve stem 27. The stem 27 is raised to a valve opening position against the resistance of spring 25 by a stem-engaging valve operating lever 28 having one end suitably pivoted to the cylinder head as indicated at 29, the other end of said lever being disposed to ride an operating cam 30 carried by a suitably journalled cam shaft 31, the latter being rotated (in the direction indicated by the arrow in Fig. 2) at the same speed as the engine crank shaft from which it is driven by any suitable form of drive mechanism (not shown). For convenient description it is assumed that piston 12 is shown in the position which it occupies after it has completed about one-third of its working stroke and that the inlet valve 22 has just been closed against its seat 22a. As previously stated, valve 22 remains in its closed position through the remainder of the working stroke of piston 12 and throughout the entire period of the exhaust stroke.

A rotary compressed-air distributing header 32 is located above the motive fluid inlet passage 20 and is suitably journalled in a casing 33 formed by part of the cylinder head 14. Casing 33 (see Fig. 3) is provided with a compressed air inlet 34 to which compressed air is delivered from compressor 7 through conduit 35. The compressed air thus supplied to casing 33 enters the rotary header 32 through an inlet opening 37, said header 32 being provided with an outlet opening 38 through which the compressed air is successively delivered from said header to each of a plurality of passages indicated at 40, 41 and 42. Passage 40 connects header casing 33 with the upper end of inlet valve chamber 21 while passage 41 connects header casing 33 with the jacket 18 of the stationary motive fluid inlet header 15. Passage 42 connects header casing 33 with a nozzle 44 formed in cylinder head 14 directly below the motive fluid inlet passage 20, the delivery end of nozzle 44 being upwardly inclined so that it opens into inlet valve chamber 21 at a point just above valve seat 22a. Header 32 is provided, at one end, with a gear 46 which meshes with and is driven by a gear 48 of equal diameter fastened to the cam shaft 31. It will thus be seen that header 32 is driven to rotate at the same speed as the cam shaft 31, the direction of rotation of the header being indicated by the applied arrow.

When the inlet valve 22 closes after the piston 12 has completed about one-third of its working stroke, the compressed air distributing header 32 is rotated to the position shown in Fig. 2. In this position of the header the outlet opening 38 thereof registers with passage 40 so that compressed air is delivered through this passage into the inlet valve chamber 21 and serves to force the motive fluid out of the inlet valve chamber and back through the passage 20 into the motive fluid inlet header 15. At this point it may be explained that, in actual practice, the engine will include a sufficient number of cylinders so that there will always be at least one cylinder inlet valve 22 in open position to ensure a continuous flow of compressed air through all the compressed-air circuits supplied by compressor 7 and represented, in part, by the headers 15, 32, 71, 82, 83, and 100. The compressed air which is forced through passage 40 into inlet valve chamber 21 absorbs heat from the valve 22 as it passes through the inlet valve chamber 21 and passage 20 to the motive fluid header 15 through which it is delivered along with the motive fluid to the open inlet valve 22 of the companion engine cylinder. It will thus be seen that the heat absorbed by the compressed air in cooling the closed inlet valve 22 of one engine cylinder is recovered in the companion engine cylinder in the performance of useful work.

During continued rotation of the compressed air distributing header 32 the discharge opening 38 thereof is rotated out of registration with passage 40 and into registration with passage 41 while inlet valve 22 still remains in its closed position. As soon as the header outlet 38 registers with passage 41 a cooling stream of compressed air is delivered through said passage into the jacket 18 partially surrounding the motive fluid inlet header 15. The compressed air thus passed through jacket 18 absorbs heat from header 15 and then passes into the interior of said header and is delivered to the open inlet valve of the companion cylinder where the absorbed head energy is recovered. At the end of the exhaust stroke inlet valve 22 is raised to the open dotted line position shown in Fig. 2 by cam 30 and cam lever 28. By this time the compressed-air distributing header 32 has rotated to a position where its discharge opening 38 registers with passage 42. Consequently, a stream of compressed air is delivered through passage 42 to nozzle 44 which directs the compressed air upwardly and across the lower face of the valve 22, thus cooling that portion of the valve which is exposed to the hot motive fluid in the engine cylinder throughout the remaining two-thirds of the working stroke of the piston and throughout the entire period of the exhaust stroke. As will be readily understood the temperature of the compressed air which is supplied directly to the compressed-air distributing header 32 by the compressor 7 is substantially lower than the temperature of the motive fluid supplied to the motive fluid inlet header 15 from the furnace 9. This compressed air therefore serves as an efficient cooling medium for absorbing heat from the valve 22, the header 15 and adjacent portions of the cylinder head 14, the heat thus absorbed by the cooling medium being subsequently recovered in the companion engine cylinder to which the compressed air is ultimately delivered through the header 15. The motive fluid is preferably supplied to the motive fluid inlet header 15 at a temperature of 2000° F. while the compressed air is preferably supplied to the compressed-air distributing header 32 at a temperature of approximately 500° F.

Each engine cylinder is also equipped with an auxiliary inlet valve 50. This valve closes upwardly against a seat 51 provided at the discharge end of a passage 52 through which, in the open position of said valve, a relatively cool stream of compressed air enters the cylinder 13 and is directed, by the deflecting action of valve 50, across the lower surfaces of the cylinder head casting 14 and exhaust valve 53. The end of passage 52 remote from valve 50 is in open communication with the previously mentioned compressed air passage 42 and is therefore supplied with compressed air when the discharge outlet 38 of the header 32 is aligned with passage 42. Valve 50 is closed against seat 51 by valve closing spring 55 and is moved downwardly to open position by the cam 56 of cam shaft 31. Inlet valves 22 and 50 are preferably timed to open at the same instant but, in some cases, it may be desirable to change the timing of these valves so that they open and close at different instants. For example, the opening and closing of valve 50 may be timed to occur later than the opening and closing of valve 22.

Exhaust valve 53 is a hollow valve carried by a hollow valve stem 58. A partition 59, consisting of two metal strips 60 separated by heat insulation 61 extends downwardly from the upper end of the valve stem bore 58 to a point spaced above the valve disc 53a. This partition divides the interior of the valve stem into a pair of flow passages 64 and 65 which communicate with each other at the lower end of said partition. Passage 64 is provided with an air inlet 66 in open communication with a passage 67 leading from a compressed-air distributing header 68.

Passage 65 is provided with an outlet 69 in communication with a passage 70 leading to a compressed-air discharge header 71. As indicated in Fig. 1 compressed air is supplied to header 68 from compressor 7 and flows thence through passage 67 and inlet 66 into the passage 64 of each exhaust valve. The air thus admitted to valve stem passage 64 flows downwardly therein and across the upper surface of the valve disc 53a and thence upwardly through passage 65, outlet 69 and passage 70 to the discharge header 71 whence it is conducted to the furnace 9 and engine cylinders 5 and 6 wherein the heat absorbed by the compressed air in cooling the exhaust valves is recovered. In the open position of exhaust valve 53 the exhaust gases pass from cylinder 13 into heat interchanger 8 where they serve to pre-heat the compressed air which is passed directly from compressor 7 to air heating furnace 9, as shown in Fig. 1. The opening and closing of exhaust valve 53 may be controlled by any suitable valve operating mechanism such as that generally indicated at 53b.

Each engine cylinder is provided with spaced inner and outer cylinder walls 75 and 76. The inner wall is a very thin wall over which are pressed a plurality of vertically spaced cooling fins 77 each provided with a large number of perforations 78. The outer wall 76 fits closely around the fins and is provided with air admission opening 80 adjacent the top of the cylinder and opening 81 adjacent the bottom of cylinder 13. Opening 80 communicates with a compressed-air supply header 82 to which compressed air is supplied from the compressor 7 while the opening 81 communicates with a discharge header 83. The compressed air, after absorbing heat from the cylinder walls and the fins 77, is delivered to the furnace 9 from header 83. The air supplied through header 82 passes around the cylinder wall 75 between the fins and also passes through the openings 78 of the fins so that it reaches the space between the lower portions of the cylinder walls 75 and 76. The fin perforations 78 serve to increase the turbulence of the compressed air and the transfer of heat from fin to air and thus assures that considerable heat will be absorbed by the compressed air in passing from the header 82 to the header 83. The fins 77 also serve, in conjunction with the outer cylinder walls 76, to strengthen the inner cylinder wall 75 which is made very thin so that there will be a rapid outward transfer of heat therethrough.

From the foregoing it will be seen that the only intentional cooling of stationary parts consists in transferring heat from the valves and cylinders to the relatively cooled compressed air which is used as a cooling medium therefor, the heat absorbed by the cooling medium being recovered in either the cylinders or the air heating furnace. It will thus be seen that the heat extracted in cooling the component parts of the engine by the compressed air cooling medium is returned to the power system and adds to the useful work and efficiency of the power plant instead of being wasted as in the case of conventional engines.

In an engine of the type described herein efficient lubrication of the cylinder walls is necessary to permit the motive fluid to be introduced into the engine cylinders at a sufficiently high temperature to ensure a high engine efficiency. In order to meet this requirement the piston 12 is designed so that it functions as a fuel pump to ensure a proper lubrication of the cylinder wall 75. To this end piston 12 is provided with an oil scraping piston ring 85 seated in a piston ring groove 86. This ring is provided with an annular scraper 87 extending downwardly from the outer edge thereof. The outer portion of ring 85 overlies an annular oil distributing channel 88 which is of substantial area and in which a ring of oil is maintained in contact with the cylinder wall 75. Channel 88 is connected, through passage 89, to the bottom portion of a recess 90 provided in the top of piston 12. Recess 90 constitutes the cylinder element of a pressure operated oil pump and is closed at the top by a normally flat diaphragm 91 which constitutes the piston element of the pump. Passage 89 constitutes the pump outlet and is controlled by a spring biased check valve 92 which closes when the oil pressure in the space between the bottom of the recess 90 and the diaphragm 91 falls below a predetermined value and opens when such pressure exceeds said predetermined value. Recess 90 is provided with a suction inlet 94 controlled by an inwardly opening ball-check valve 95. The lower end of suction inlet 94 dips into a body of oil which is maintained in an oil sump 96 carried by the piston head. As indicated by the arrows 98, cool oil is directed upwardly from the crank case by any suitable means so that it strikes against the lower surface of the piston head and splashes into the sump 96.

During the working stroke of piston 12 the pressure acting downwardly against the piston head and the diaphragm 91 causes the latter to be deflected downwardly from its normally flat condition. The oil trapped between the bottom of recess 90 and diaphragm 91 is thus forced through passage 89 to the distributing channel 88 whence the oil escapes downwardly along the cylinder wall 75 and past the lower piston ring 85a to the crank case, it being understood that the controlling valve 92 of passage 89 opens automatically when the oil pressure in recess 90 is increased by the downward deflection of diaphragm 91. It may be pointed out here that the oil pressure per square inch developed in the oil distributing channel 88 by the downward deflection of diaphragm 91 is equal to the pressure per square inch of the motive fluid in the cylinder space above the piston head 12 so that escape of the motive fluid past the oil scraping ring 85 and the oil distributing channel 88 is effectively prevented. It will thus be seen that the piston does not depend upon the perfect fitting of the piston rings to make it gas tight. It may also be noted here that, during the working stroke of the piston, the scraper 87 of piston ring 85 serves to scrape the oil film on cylinder wall 75 in the direction of the crank case. During the upward or exhaust stroke of the piston the diaphragm 91 is permitted to return to its flat shape by reason of the reduction in pressure in the cylinder space above the piston head. The upward flexing of the diaphragm to its normal flat condition creates a suction in the recess 90 so that the ball-check valve 95 opens and oil from the sump 96 is sucked into said recess through the suction inlet 94. It will thus be seen that the space between the bottom wall of the recess 90 and the diaphragm 91 is filled with oil during each exhaust stroke of the piston and is emptied or substantially emptied during each working stroke of the piston. It will also be noted that, with the lubricating arrangement described herein, the portion of the cylinder wall traversed by the piston during each working stroke is first washed with fresh cool oil supplied thereto from the distributing channel 88 and is then scraped clean by the scraper ring 85 so that there is practically no oil left on those portions of the cylinder surface which are exposed to the hot motive fluid gas by the piston as it travels toward the end of its working stroke. This feature is of particular importance in an engine of the type described herein since it permits the use of motive fluid at a higher temperature and pressure than would otherwise be feasible and thereby improves the efficiency of the engine.

The engine casting 14, which serves both of the cylinder units 5 and 6, is also provided with a full length header 100 through which compressed air is passed from the air compressor 7 to the air heating furnace 9. The heat absorbed from the cylinder head casting 14 by the compressed air during its passage through header 100 is recovered in the furnace in the preparation of fresh motive fluid.

Having thus described what I now consider to be the preferred embodiment of this invention it will be understood that various modifications may be resorted to within the scope and spirit of the invention as defined by the appended claims.

I claim:

1. An extended combustion engine comprising an air compressor, an air heating pressure-furnace, a plurality of engine cylinders having pistons working therein, each cylinder having an exhaust valve, an inlet valve chamber, and an inlet valve controlling an opening placing said inlet valve chamber in communication with the interior of the cylinder, a conduit through which compressed air is conveyed from the compressor to the air heating furnace, means for burning fuel in said furnace to heat said compressed air, conduit means for conveying the heated compressed air and products of combustion from said furnace to the inlet valve chambers of said cylinders and conduit means by-passing said furnace and serving to convey a portion of the compressed air from said compressor to each of said inlet valve chambers substantially without loss of pressure while the inlet valve associated with said chamber is closed, whereby said closed inlet valve is cooled by the relatively cool compressed air supplied directly from the compressor, the heat thus transferred from the inlet valve to the valve-cooling compressed air being immediately thereafter added to the furnace gases as the latter are admitted to the cylinder, by the opening of the inlet valve, to operate the piston working in said cylinder.

2. An engine as set forth in claim 1, in which each inlet valve includes a circular disc and is movable from a closed position in which the disc closes the associated valve opening to an open position in which the disc is moved into the inlet valve chamber away from said opening, said valve chamber having an auxiliary air duct through which a jet of cooling compressed air is directed against the face of said disc in the open position of the inlet valve, said jet of cooling air mixing with the furnace gases as the latter enter the cylinder to operate the piston working therein.

3. An engine as set forth in claim 1, in which each cylinder is provided with an air duct having its delivery end opening into said cylinder and having its opposite end connected to receive a supply of relatively cool compressed air from said compressor and an auxiliary inlet valve including a disc adpated to close the delivery end of said duct in the closed position of said auxiliary valve and to move into the cylinder when the valve is open, said disc being shaped to cause a layer of the relatively cool compressed air delivered to the cylinder through said duct to be spread over the surface of the end of said cylinder, said auxiliary inlet valve being timed to open while said first named inlet valve is open.

4. An engine as set forth in claim 1, in which each exhaust valve comprises a stationary valve stem guide, a hollow valve stem slidably mounted in said guide, a hollow disc on one end of said stem controlling an exhaust passage leading from the associated cylinder, a longitudinal partition dividing the interior of the stem into two passages opening into the interior of the hollow disc, said valve stem being provided with a compressed-air inlet opening placing one of said passages in continuous communication with a compressed-air inlet opening in the valve stem guide and being also provided with a compressed-air outlet opening placing the other of said passages in communication with a compressed-air outlet opening in said guide, conduit means through which a supply of relatively cool compressed air is conveyed from the compressor to the compressed-air inlet opening of said valve stem guide and conduit means through which compressed air is conveyed from the compressed-air outlet opening of the valve stem guide to the compressed-air inlet side of said furnace whereby said exhaust valve is cooled by the compressed air passing therethrough and the heat transferred to said compressed air from said valve is delivered into said furnace to assist in operating said engine.

5. An engine as set forth in claim 1, including a rotating distributing header through which the compressed air for cooling said inlet valves is distributed to the inlet valve chambers from the conduit means by-passing the air heating furnace, said distributing header being mechanically synchronized with the valves of the engine to operate in suitably timed relation therewith and being provided with outlet openings which move into and out of registration with corresponding stationary openings or passages through which the compressed air passes from said header into said inlet valve chambers.

6. An engine comprising a cylinder, a piston operating therein, an inlet valve chamber through which motive fluid is delivered to said cylinder to operate said piston, an inlet valve in said chamber controlling the opening through which the motive fluid enters said cylinder, a motive fluid inlet header partially surrounded by a cooling jacket and provided with an outlet through which motive fluid passes from said header to said chamber, means for supplying to said header a hot gaseous motive fluid at a high temperature and pressure and means for intermittently supplying to the cooling jacket of said header a cooling medium consisting of compressed air at a temperature below the temperature of the motive fluid.

7. An external combustion engine comprising an air compressor, an air heating furnace, engine cylinders equipped with inlet and exhaust valves, pistons working in said cylinders, a heat interchanger through which exhaust gases from said cylinders are passed, conduit means for conveying compressed air through said heat interchanger from said compressor to said furnace, whereby the compressed air so conveyed is heated by said exhaust gases during its passage through the heat interchanger, means for burning liquid fuel in said furnace to heat the compressed air supplied thereto from said compressor, conduit means through which the heated compressed air and products of combustion are conveyed from said furnace to the inlet valves of the engine cylinders for delivery into the cylinders in the open position of said valves, conduit means through which compressed air is conveyed, substantially without loss of pressure, directly from said compressors to said inlet valves to cool said valves, means for intermittently interrupting the flow of the valve-cooling compressed air to each of said inlet valves in turn and means for immediately thereafter opening said inlet valves to permit the valve-cooling compressed air to enter the cylinder along with the heated compressed air and products of combustion supplied by the furnace.

8. An engine as set forth in claim 7, characterized in that the means for interrupting the flow of the valve-cooling compressed air to the inlet valve functions to permit flow of said compressed air to the inlet valve of one cylinder while interrupting the flow of said compressed air to the inlet valves of other cylinders and wherein said valve-cooling compressed air is supplied to said inlet valves at a pressure slightly higher than the furnace mixture of heated compressed air and products of combustion which are also delivered to said valves from said furnace, whereby said valve-cooling compressed air is effective to displace said furnace mixture from around said inlet valves when each of said inlet valves is closed.

9. An engine as set forth in claim 7, in which each cylinder is provided with an inlet valve chamber in which its inlet valve operates and in which each of said inlet valves comprises a stem and a disc attached to said stem for closing a valve opening placing the valve inlet chamber in communication with the interior of said cylinder and means for operating said inlet valve so that, during opening of the valve, the disc moves from said valve opening into said chamber and means whereby said disc and stem are cooled by the valve-cooling compressed air supplied to the valve directly from said compressor.

HUMPHREYS MILLIKEN.

REFERENCES CITED

The following references are of record in the file of this patent:

UNITED STATES PATENTS

| Number | Name | Date |
|---|---|---|
| 975,255 | Koven | Nov. 8, 1910 |
| 1,070,139 | Kessler | Aug. 12, 1913 |
| 1,302,582 | Norman | May 6, 1919 |
| 1,414,495 | Bangs | May 2, 1922 |
| 1,700,077 | Roberts | Jan. 22, 1929 |
| 1,846,800 | Edman | Feb. 23, 1932 |
| 1,873,119 | Griswold | Aug. 23, 1932 |
| 2,041,160 | Zahodiakin | May 19, 1936 |
| 2,065,106 | Symons | Dec. 22, 1936 |
| 2,066,489 | Shannon | Jan. 5, 1937 |
| 2,074,602 | Wilstam | Mar. 23, 1937 |
| 2,209,078 | Gettinger | July 23, 1940 |
| 2,372,477 | Engelhardt | Mar. 27, 1945 |